(12) United States Patent
Okano et al.

(10) Patent No.: US 9,178,566 B2
(45) Date of Patent: Nov. 3, 2015

(54) WIRELESS COMMUNICATION TERMINAL

(75) Inventors: Hideo Okano, Hanno (JP); Yasuhiro Hasegawa, Tokyo (JP)

(73) Assignee: OLYMPUS CORPORATION, Tokyo (JP)

( * ) Notice: Subject to any disclaimer, the term of this patent is extended or adjusted under 35 U.S.C. 154(b) by 595 days.

(21) Appl. No.: 13/403,582

(22) Filed: Feb. 23, 2012

(65) Prior Publication Data

US 2012/0220232 A1 Aug. 30, 2012

(30) Foreign Application Priority Data

Feb. 25, 2011 (JP) .................................. 2011-040016

(51) Int. Cl.
*H04B 7/00* (2006.01)
*H04B 5/00* (2006.01)
*H04W 4/00* (2009.01)

(52) U.S. Cl.
CPC ........ *H04B 5/00* (2013.01); *H04W 4/001* (2013.01)

(58) Field of Classification Search
CPC .................................. H04W 4/001; H04B 5/00
USPC .................... 455/41.1, 41.2, 41.3, 412.2, 521
See application file for complete search history.

(56) References Cited

U.S. PATENT DOCUMENTS

| | | | |
|---|---|---|---|
| 2006/0064136 A1 | 3/2006 | Wang | |
| 2007/0027382 A1* | 2/2007 | Berman et al. | 600/347 |
| 2011/0022411 A1* | 1/2011 | Hjelm et al. | 705/2 |

FOREIGN PATENT DOCUMENTS

| | | | | |
|---|---|---|---|---|
| JP | 2006-024002 A | | 1/2006 | |
| JP | 2006024002 | * | 1/2006 | ............ G08B 25/00 |
| JP | 2006-519626 A | | 8/2006 | |
| JP | 2007-034398 A | | 2/2007 | |
| JP | 2007-524456 A | | 8/2007 | |
| JP | 2008-508981 A | | 3/2008 | |
| JP | 2010-507928 A | | 3/2010 | |
| JP | 2010-532954 A | | 10/2010 | |
| JP | 2010-534049 A | | 10/2010 | |
| JP | 2011-502369 A | | 1/2011 | |
| WO | 2004/056301 A2 | | 7/2004 | |

(Continued)

OTHER PUBLICATIONS

Japanese Notice of Allowance dated Jul. 1, 2014, issued in corresponding JP application No. 2011-040016 with English translation (6 pages).

*Primary Examiner* — Ping Hsieh
(74) *Attorney, Agent, or Firm* — Westerman, Hattori, Daniels & Adrian, LLP

(57) ABSTRACT

A wireless communication terminal may include a first interface that receives urgency data indicating urgency of an event detected by an implantable medical device and being transmitted from the implantable medical device using a first wireless communication protocol, and detailed data indicating details of the event and having a greater data size than the urgency data and being transmitted from the implantable medical device using a second wireless communication protocol, a second interface that transmits the detailed data to an external device using the second wireless communication protocol, a display unit that displays information, and a control unit that performs control to cause the display unit to display summary information based on the urgency of the event, and the second interface to transmit the detailed data received by the first interface to the external device based on the urgency data received by the first interface.

6 Claims, 6 Drawing Sheets

(56) References Cited

FOREIGN PATENT DOCUMENTS

| WO | 2005/000397 | A1 | 1/2005 |
| WO | 2006/020546 | A1 | 2/2006 |
| WO | 2008/021920 | A2 | 2/2008 |
| WO | 2009/002956 | A1 | 12/2008 |
| WO | 2009/013238 | A1 | 1/2009 |
| WO | 2009/032134 | A2 | 3/2009 |

* cited by examiner

WIRELESS COMMUNICATION TERMINAL

BACKGROUND OF THE INVENTION

1. Field of the Invention

The present invention relates to a wireless communication terminal.

Priority is claimed on Japanese Patent Application No. 2011-040016, filed Feb. 25, 2011, the content of which is incorporated herein by reference.

2. Description of the Related Art

All patents, patent applications, patent publications, scientific articles, and the like, which will hereinafter be cited or identified in the present application, will hereby be incorporated by reference in their entirety in order to describe more fully the state of the art to which the present invention pertains.

In the fields of medicine and healthcare, biometric data is collected from a surface or inside of a human body using a terminal including various sensors, and the biometric data collected by the terminal is transmitted to and accumulated in an accumulation device. Efforts to use the biometric data accumulated in the accumulation device for healthcare, disease diagnosis, treatment and the like are actively underway. In such a use, when the terminal and the accumulation device are connected using a cable to transmit the biometric data, a freedom of action is limited. Accordingly, it is desirable to transmit the biometric data through wireless communication and drive the terminal using a battery, such that the terminal can be freely carried. Such a need is higher in a medical field, and particularly, in an implantable medical device (IMD).

In an IMD, generally, a sensor detects urgency information, and a delivery destination or a delivery method for urgency content is changed based on urgency of the detected urgency information. Further, a notification device that transmits the emergency determined based on the information detected by the sensor in any notification form suitable for urgency of the emergency to a delivery destination device to notify a user of the emergency is disclosed (e.g., see Japanese Unexamined Patent Application, First Publication No. 2006-24002).

In technology disclosed in Japanese Unexamined Patent Application, First Publication No. 2006-24002, a user cannot confirm the urgency information determined based on the information detected by the sensor at a notification device, but only at a delivery destination device.

SUMMARY

The present invention provides a wireless communication terminal capable of immediately confirming urgency even when there is a delivery destination device of urgency content in a remote place.

A wireless communication terminal may include: a first interface that receives urgency data and detailed data, the urgency data indicating urgency of an event detected by an implantable medical device, the urgency data being transmitted from the implantable medical device using a first wireless communication protocol, the detailed data indicating details of the event and having a greater data size than the urgency data, the detailed data being transmitted from the implantable medical device using a second wireless communication protocol; a second interface that transmits the detailed data to an external device using the second wireless communication protocol; a display unit that displays information; and a control unit that performs control to cause the display unit to display summary information based on the urgency of the event, the control unit performing control to cause the second interface to transmit the detailed data, which has been received by the first interface, to the external device based on the urgency data that has been received by the first interface.

The first interface separately may receive the urgency data and the detailed data.

The first interface may receive the urgency data, which has been encrypted using a first encrypting method, and the second interface may transmit the detailed data, which has been encrypted using a second encrypting method that is different from the first encrypting method, to the external device.

The control unit may judge the urgency based on the urgency data and determine a transmission timing of the detailed data and the external device, which is a transmission destination, based on the urgency.

The control unit may judge the urgency based on the urgency data and determine transmission content according to the detailed data and the external device, which is a transmission destination, based on the urgency.

In the present invention, the wireless terminal device includes the display unit for displaying information, and the control unit causes the display unit to display summary information corresponding to urgency of an event and the second interface to transmit the detailed data received by the first interface to the external device based on the urgency data received by the first interface. Accordingly, since the summary information corresponding to the urgency of the event can be displayed on the display unit, it is possible to immediately confirm urgency even when the external device that is a transmission destination of detailed data indicating details of an event is in a remote place.

BRIEF DESCRIPTION OF THE DRAWINGS

The above features and advantages of the present invention will be more apparent from the following description of certain preferred embodiments taken in conjunction with the accompanying drawings, in which.

DETAILED DESCRIPTION OF THE PREFERRED EMBODIMENTS

The present invention will be now described herein with reference to illustrative preferred embodiments. Those skilled in the art will recognize that many alternative preferred embodiments can be accomplished using the teaching of the present invention and that the present invention is not limited to the preferred embodiments illustrated for explanatory purpose.

First Preferred Embodiment

Figure 1:
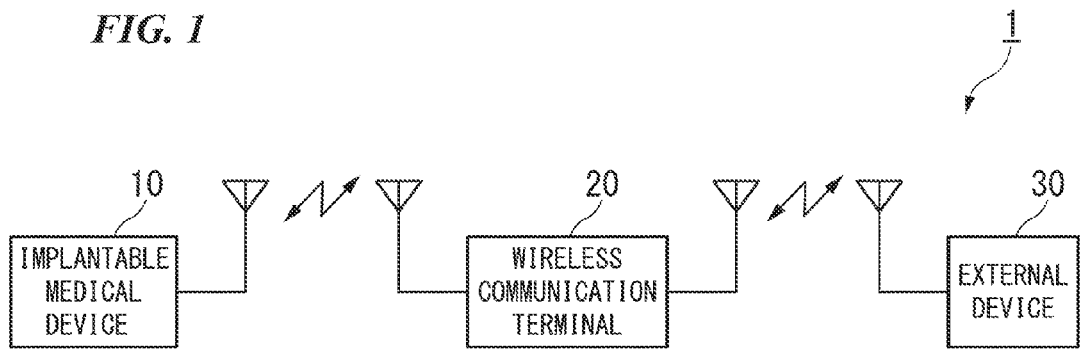
FIG. 1 is a schematic diagram illustrating a configuration of a biometric data monitoring system in accordance with a first preferred embodiment of the present invention.

Hereinafter, a first preferred embodiment of the present invention will be described with reference to the accompanying drawings. FIG. 1 is a schematic diagram illustrating a configuration of a biometric data monitoring system in accordance with the first preferred embodiment of the present invention. A biometric data monitoring system 1 includes an implantable medical device 10, a wireless communication terminal 20, and an external device 30. In the first preferred embodiment, the implantable medical device 10 and the wireless communication terminal 20 perform one-to-one wireless communication. The implantable medical device 10 is implanted in a human body and acquires biometric data such as blood pressure, pulse, electrocardiogram, heart rate, blood alcohol content, body temperature, urine sugar, and blood sugar, and device state data indicating a state of each unit included in the implantable medical device 10 using various sensors. When there is an abnormality in the acquired biometric data, the implantable medical device 10 performs treatment. Further, when the implantable medical device 10 has performed treatment, the implantable medical device 10 generates treatment data indicating detailed information of the performed treatment. In the first preferred embodiment, the biometric data, the device state data, and the treatment data are defined as detailed data.

Further, the implantable medical device 10 generates urgency data indicating whether the acquired and generated detailed data needs to be rapidly transmitted to the wireless communication terminal 20 based on the detailed data. Further, the implantable medical device 10 encrypts the urgency data using a first encrypting method and encrypts the detailed data using a second encrypting method. The implantable medical device 10 wirelessly transmits the encrypted urgency data to the wireless communication terminal 20 using a first wireless communication protocol and wirelessly transmits the encrypted detailed data using a second wireless communication protocol.

Further, as described above, the detailed data is the biometric data such as blood pressure, pulse, electrocardiogram, heart rate, blood alcohol content, body temperature, urine sugar, and blood sugar detected by the implantable medical device 10, the device state data indicating a state of each unit included in the implantable medical device 10, or the treatment data indicating detailed information of the treatment performed by the implantable medical device 10. Further, the urgency data is data indicating that the detailed data needs to be rapidly transmitted. Accordingly, the detailed data has a greater data size than the urgency data. Further, the first encrypting method and the second encrypting method may be any encrypting methods as long as the methods can perform encryption and decoding. Further, the first wireless communication protocol and the second wireless communication protocol may be any protocols as long as the protocols can perform the wireless transmission.

The wireless communication terminal 20 receives the urgency data wirelessly transmitted from the implantable medical device 10 using the first wireless communication protocol and the detailed data wirelessly transmitted from the implantable medical device 10 using the second wireless communication protocol. Further, the wireless communication terminal 20 decodes the received urgency data. Further, the wireless communication terminal 20 displays information based on the decoded urgency data and outputs sound based on the decoded urgency data. Further, the wireless communication terminal 20 wirelessly transmits the received detailed data to the external device using the second wireless communication protocol. The external device 30 receives the detailed data wirelessly transmitted from the wireless communication terminal 20 using the second wireless communication protocol, decodes the detailed data, and stores the decoded detailed data.

Figure 2:
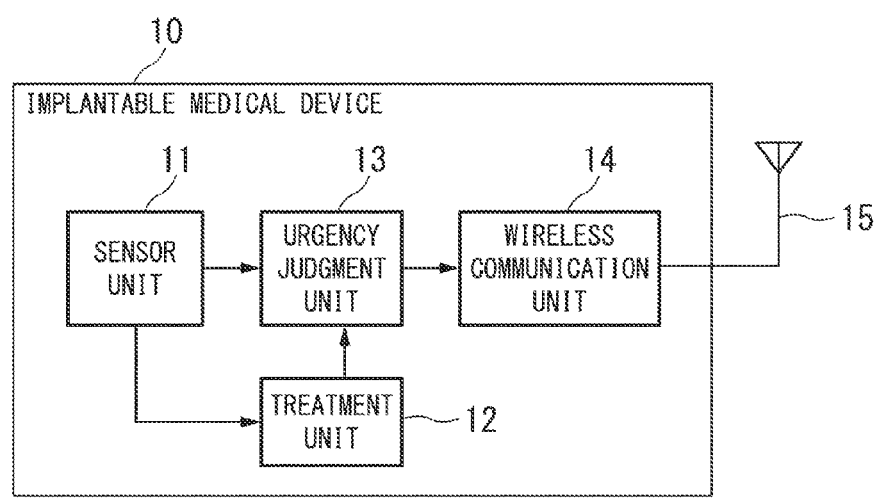
FIG. 2 is a block diagram illustrating a configuration of an implantable medical device in accordance with the first preferred embodiment of the present invention.

Next, a configuration of the implantable medical device 10 will be described. FIG. 2 is a block diagram illustrating a configuration of the implantable medical device 10 in accordance with the first preferred embodiment of the present invention. In the shown example, the implantable medical device 10 includes a sensor unit 11, a treatment unit 12, an urgency judgment unit 13, a wireless communication unit 14, and an antenna 15.

The sensor unit 11 senses blood pressure, pulse, electrocardiogram, heart rate, blood alcohol content, body temperature, urine sugar, blood sugar, and the like to acquire biometric data, and outputs the biometric data to the treatment unit 12 and the urgency judgment unit 13. Also, the sensor unit 11 senses a state of each unit included in the implantable medical device 10 to acquire device state data, and outputs the device state data to the urgency judgment unit 13. The treatment unit 12 acquires the biometric data output by the sensor unit 11 and performs treatment based on the acquired biometric data. Further, when the treatment unit 12 has performed the treatment, the treatment unit 12 generates treatment data indicating detailed information of the performed treatment and outputs the treatment data to the urgency judgment unit 13.

When an event (abnormality of the biometric data, abnormality of the device state data or performance of treatment) is generated, the urgency judgment unit 13 detects the event based on the detailed data output by the sensor unit 11 and the treatment unit 12. When the urgency judgment unit 13 has detected the event, the urgency judgment unit 13 judges whether the detailed data is to be transmitted to the wireless communication terminal 20. For example, if the detected event is mild abnormality or performance of mild treatment, the urgency judgment unit 13 judges that the detailed data is not to be transmitted to the wireless communication terminal 20 and, otherwise, judges that the detailed data is to be transmitted to the wireless communication terminal 20.

If the urgency judgment unit 13 judges that the detailed data is to be transmitted to the wireless communication terminal 20, the urgency judgment unit 13 judges whether the detailed data needs to be rapidly transmitted (delay is not allowed) and generates urgency data indicating whether the detailed data needs to be rapidly transmitted. For example, if the urgency judgment unit 13 judges that the detailed data needs to be rapidly transmitted (delay is not allowed), the urgency judgment unit 13 generates urgency data indicating "high" urgency. If the urgency judgment unit 13 judges that the detailed data does not need to be rapidly transmitted (delay is allowed), the urgency judgment unit 13 generates urgency data indicating "low" urgency.

If the urgency judgment unit 13 judges that the detailed data output by the sensor unit 11 is to be transmitted to the wireless communication terminal 20, the urgency judgment unit 13 encrypts the urgency data using the first encrypting method, encrypts the detailed data using the second encrypting method, and outputs the encrypted urgency data and the encrypted detailed data to the wireless communication unit 14.

The wireless communication unit 14 acquires the urgency data and the detailed data output by the urgency judgment unit 13. The wireless communication unit 14 transmits the acquired urgency data to the wireless communication terminal 20 via the antenna 15 using the first wireless communication protocol. Further, the wireless communication unit 14 transmits the acquired detailed data to the wireless communication terminal 20 via the antenna 15 using the second wireless communication protocol.

Figure 3:
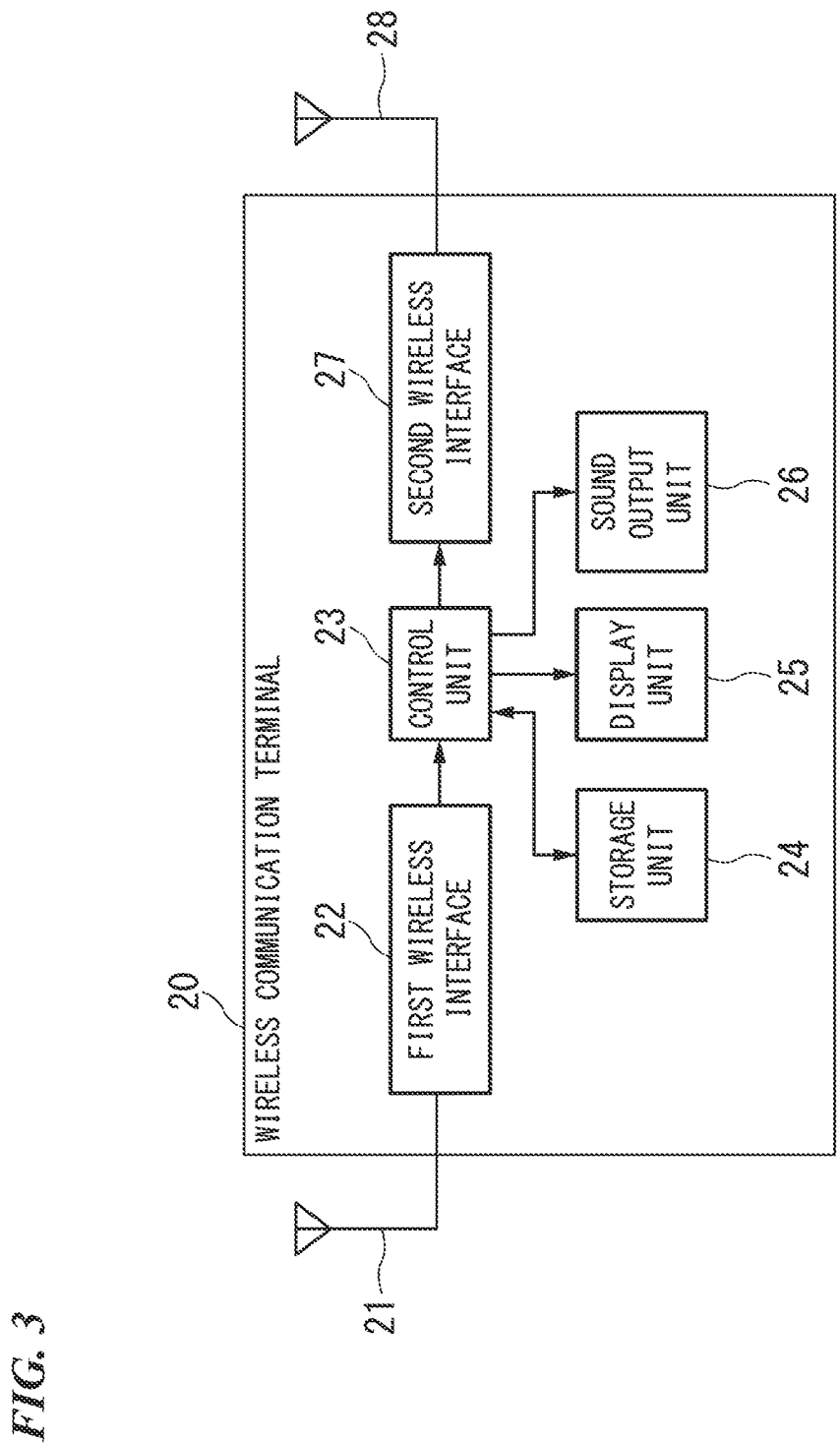
FIG. 3 is a block diagram illustrating a configuration of a wireless communication terminal in accordance with the first preferred embodiment of the present invention.

Next, a configuration of the wireless communication terminal 20 will be described. FIG. 3 is a block diagram illustrating a configuration of the wireless communication terminal 20 in accordance with the first preferred embodiment of the present invention. In the shown example, the wireless communication terminal 20 includes a first antenna 21, a first wireless interface 22 (a first interface), a control unit 23, a storage unit 24, a display unit 25, a sound output unit 26, a second wireless interface 27 (a second interface), and a second antenna 28.

The first wireless interface 22 receives the urgency data, which is transmitted from the implantable medical device 10, via the first antenna 21 using the first wireless communication protocol. The first wireless interface 22 also receives the detailed data, which is transmitted from the implantable medical device 10, via the first antenna 21 using the second wireless communication protocol. The first wireless interface 22 outputs the received urgency data and detailed data to the control unit 23.

The control unit 23 acquires the urgency data and the detailed data output by the first wireless interface 22. Further, the control unit 23 decodes the acquired urgency data. The control unit 23 causes the display unit 25 to display content based on the urgency data, and the sound output unit 26 to output sound based on the urgency data. For example, if the acquired urgency data is data indicating "high" urgency, the control unit 23 causes the display unit 25 to display data (e.g., alarm information for help, urgency information, a state of a patient, a condition of the patient, an emergency contact (e.g., a contact of a home or a contact of a hospital) stored in the storage unit 24 in advance, periodically divides sound data (e.g., a sound signal or alarm sound for help) stored in the storage unit 24 in advance, and causes the sound output unit 26 to output the resultant sound data. Further, the control unit 23 outputs the acquired detailed data to the second wireless interface 27.

The storage unit 24 stores the display data or the sound data. The display unit 25 is a display device such as a liquid crystal display (LCD), and displays content corresponding to the urgency data under control of the control unit 23. The sound output unit 26 is, for example, a speaker, and outputs sound corresponding to the urgency data under control of the control unit 23. The second wireless interface 27 acquires the detailed data output by the control unit 23 and transmits the acquired detailed data to the external device 30 via the second antenna 28 using the second wireless communication protocol. Further, the first antenna 21 and the second antenna 28 may be configured as one antenna and the first wireless interface 22 and the second wireless interface 27 may share the antenna.

Figure 4:
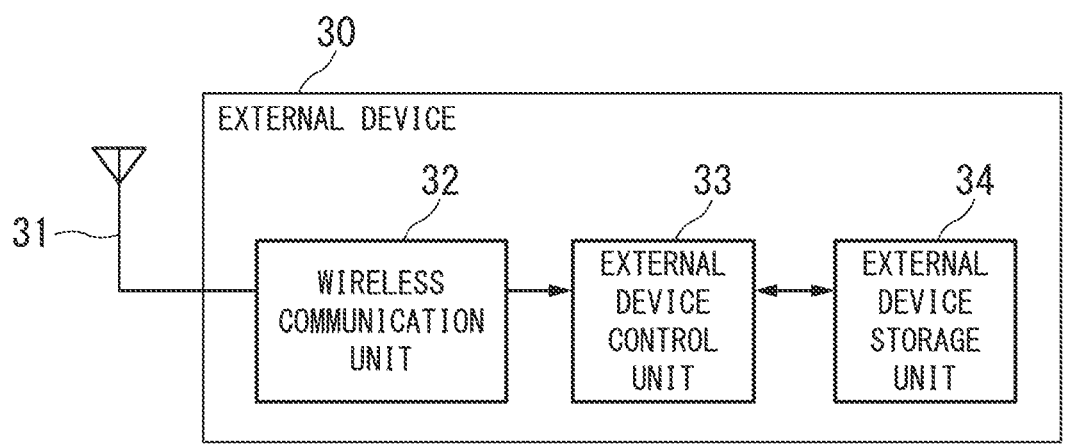
FIG. 4 is a block diagram illustrating a configuration of an external device in accordance with the first preferred embodiment of the present invention.

Next, a configuration of the external device 30 will be described. FIG. 4 is a block diagram illustrating a configuration of the external device 30 in accordance with the first preferred embodiment of the present invention. In the shown example, the external device 30 includes an antenna 31, a wireless communication unit 32, an external device control unit 33, and an external device storage unit 34.

The wireless communication unit 32 receives the detailed data, which is transmitted from the wireless communication terminal 20, via the antenna 31 using the second wireless communication protocol. Further, the wireless communication unit 32 outputs the received detailed data to the external device control unit 33. The external device control unit 33 acquires and decodes the detailed data output by the wireless communication unit 32. The external device control unit 33 stores the decoded detailed data in the external device storage unit 34. The external device storage unit 34 stores the detailed data, based on control of the external device control unit 33. This configuration enables the external device 30 to store the detailed data transmitted from the wireless communication terminal 20.

Figure 5:
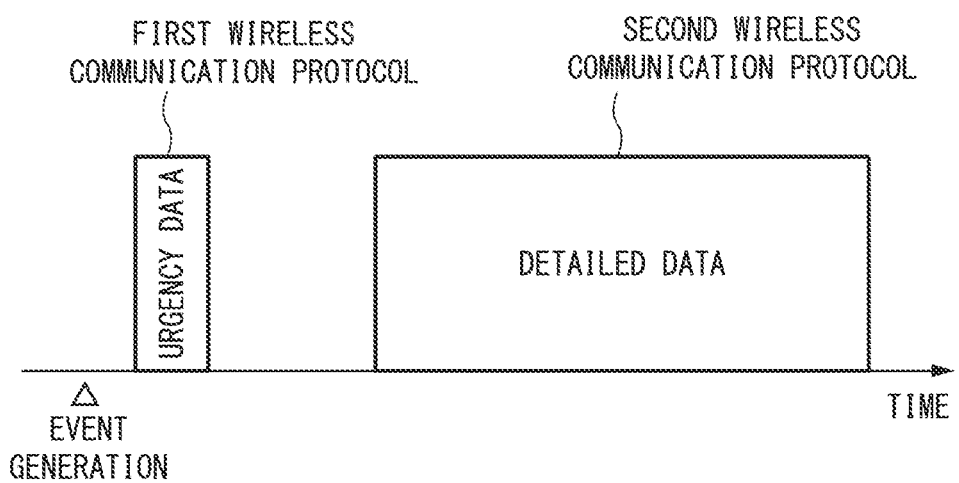
FIG. 5 is a schematic diagram illustrating timing when the implantable medical device transmits urgency data and detailed data to the wireless communication terminal in accordance with the first preferred embodiment of the present invention.

Next, timing when the implantable medical device 10 transmits the urgency data and the detailed data to the wireless communication terminal 20 will be described. FIG. 5 is a schematic diagram illustrating timing when the implantable medical device 10 transmits the urgency data and the detailed data to the wireless communication terminal 20 in accordance with the first preferred embodiment of the present invention. A horizontal axis indicates time. In the shown example, after the implantable medical device 10 detects that an event has been generated, the implantable medical device 10 transmits the urgency data using the first wireless communication protocol. After the implantable medical device 10 completes the transmission of the urgency data, the implantable medical device 10 transmits the detailed data using the second wireless communication protocol. In the shown example, the implantable medical device 10 transmits the urgency data using the first wireless communication protocol after detecting that an event has been generated, and transmits the detailed data using the second wireless communication protocol after completing the transmission of the urgency data, but the present invention is not limited thereto. For example, after the event is generated, the implantable medical device 10 may transmit the detailed data using the second wireless communication protocol, and then transmit urgency data using the first wireless communication protocol after completing the transmission of the detailed data.

Figure 6:
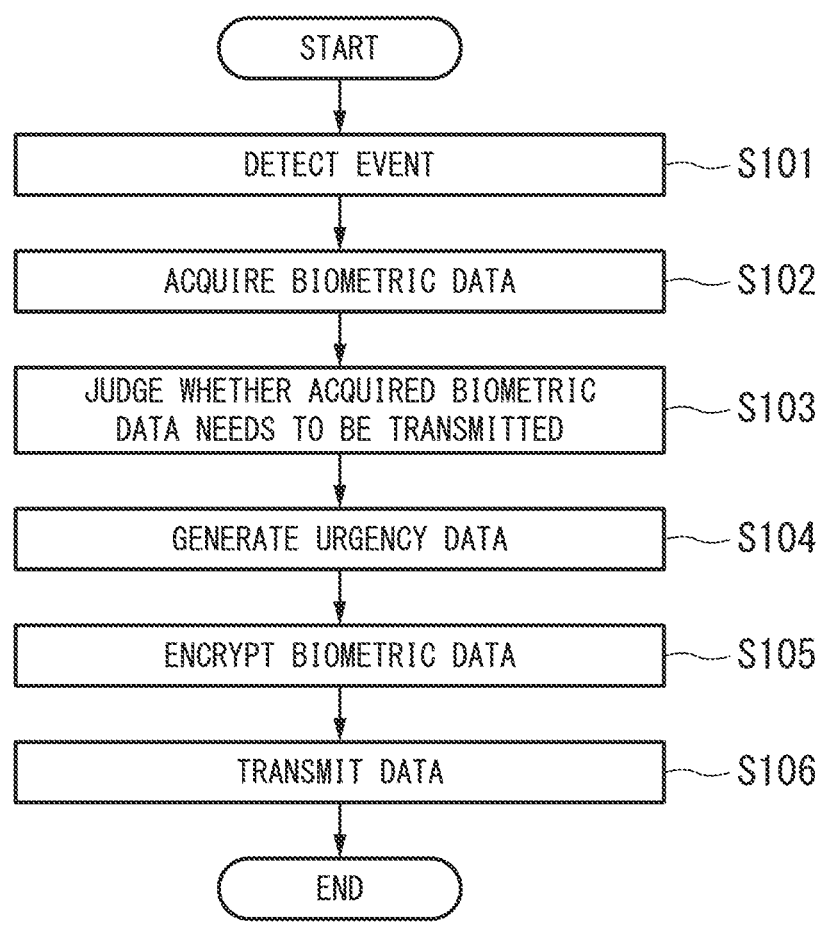
FIG. 6 is a flowchart illustrating an operation of the implantable medical device in accordance with the first preferred embodiment of the present invention.

Next, operation of the implantable medical device 10 will be described with reference to FIG. 6. FIG. 6 is a flowchart illustrating operation of the implantable medical device 10 in accordance with the first preferred embodiment of the present invention.

(Step S101)

The sensor unit 11 and the treatment unit 12 output the detailed data to the urgency judgment unit 13. The urgency judgment unit 13 detects that an event has been generated based on the detailed data output by the sensor unit 11 and the treatment unit 12. Then, the process proceeds to step S102.

(Step S102)

If the urgency judgment unit 13 detects the event, the urgency judgment unit 13 acquires the detailed data output from the sensor unit 11 and the treatment unit 12. For example, the urgency judgment unit 13 acquires the detailed data within a given time before or after a time when the event has been detected. Then, the process proceeds to step S103.

(Step S103)

The urgency judgment unit 13 judges whether the detailed data acquired in the process of step S102 needs to be transmitted to the wireless communication terminal 20. Then, the process proceeds to step S104.

(Step S104)

If the urgency judgment unit 13 judges that the detailed data acquired in the process of step S102 needs to be transmitted to the wireless communication terminal 20, the urgency judgment unit 13 generates urgency data indicating whether the detailed data needs to be rapidly transmitted based on the detailed data. Then, the urgency judgment unit 13 performs an encoding process (encryption) to convert the urgency data into ASCII code so that the wireless terminal device 10 can simply decode the urgency data when performing a process using the urgency data, and outputs the encoded urgency data to the wireless communication unit 14. Then, the process proceeds to step S105.

(Step S105)

The urgency judgment unit 13 converts the detailed data acquired in the process of step S102 into code to allocate other letters, performs simple substitution cipher, polyalphabetic substitution cipher, or letter sorting, or performs conversion using "key" code, for encryption (performs an encoding process with high security). Then, the urgency judgment unit 13 outputs the encrypted detailed data to the wireless communication unit 14. Then, the process proceeds to step S106.

(Step S106)

The wireless communication unit 14 transmits the urgency data and the detailed data to the wireless communication terminal 20 using a communication method agreed upon with the wireless communication terminal 20 in advance. Specifically, the wireless communication unit 14 transmits the urgency data, which is output by the urgency judgment unit 13 in the process of step S104, to the wireless communication terminal 20 via the antenna 15 using the first wireless communication protocol. Then, the wireless communication unit 14 transmits the detailed data, which is output by the urgency judgment unit 13 in the process of step S105, to the wireless communication terminal 20 via the antenna 15 using the second wireless communication protocol. Then, the process ends. Further, in the first preferred embodiment, the implantable medical device 10 separately transmits the urgency data and the detailed data to the wireless communication terminal 20.

Figure 7:
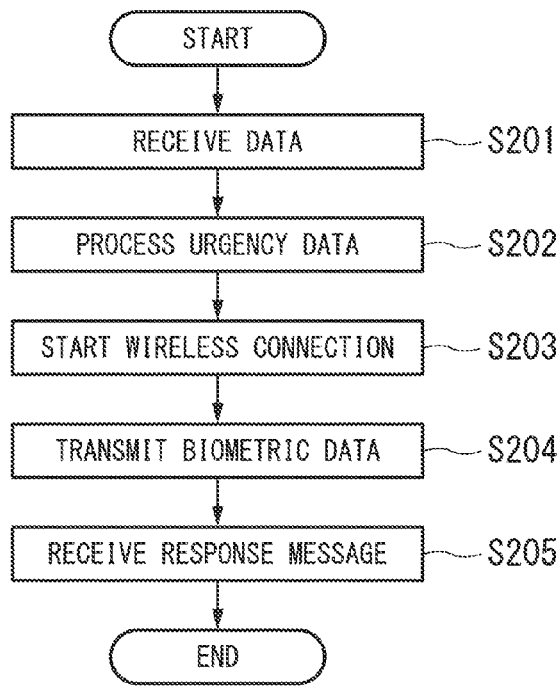
FIG. 7 is a flowchart illustrating an operation of the wireless communication terminal in accordance with the first preferred embodiment of the present invention.

Next, operation of the wireless communication terminal 20 will be described with reference to FIG. 7. FIG. 7 is a flowchart illustrating an operation of the wireless communication terminal 20 in accordance with the first preferred embodiment of the present invention.

(Step S201)

The first wireless interface 22 of the wireless communication terminal 20 receives the urgency data and the detailed data from the implantable medical device 10 using a communication method agreed upon with the implantable medical device 10 in advance. In the first preferred embodiment, the communication method is agreed upon so that the urgency data is first received using the first wireless communication protocol and then the detailed data is received using the second wireless communication protocol. Specifically, first, the first wireless interface 22 receives the urgency data, which is transmitted from the implantable medical device 10, via the first antenna 21 using the first wireless communication protocol. Then, the first wireless interface 22 receives the detailed data, which is transmitted from the implantable medical device 10, via the first antenna 21 using the second wireless communication protocol. Then, the process proceeds to step S202.

(Step S202)

The control unit 23 decodes the urgency data received by the first wireless interface 22 in the process of step S201. Then, based on the urgency data, the control unit 23 controls the display unit 25 to display a message and controls the sound output unit 26 to output an alarm sound, voice, music or the like. For example, when the urgency data is data indicating "high" urgency, the control unit 23 causes the display unit 25 to display alarm information for help, urgency information, a state of a patient, a condition of the patient, urgency contact (a contact of a home or contact of a hospital) or the like, and the sound output unit 26 to output, for example, a sound signal or alarm sound for help. The display unit 25 continues to display the message until a display stop process is performed. Further, the sound output unit 26 continues to output the sound until the sound output stop process is performed. Then, the process proceeds to step S203. Further, data indicating content of the message displayed on the display unit 25, and data such as an alarm sound, voice, or music output by the sound output unit 26 are stored in the storage unit 24 of the wireless communication terminal 20 from another device using wireless communication in advance.

(Step S203)

The control unit 23 controls the second wireless interface 27 to start wireless connection with the external device 30. Then, the process proceeds to step S204.

(Step S204)

The control unit 23 outputs the detailed data received by the first wireless interface 22 in the process of step S201 to the second wireless interface 27 without decoding the detailed data. The second wireless interface 27 acquires the detailed data output by the control unit 23 and transmits the detailed data to the external device 30. Then, the process proceeds to step S205.

(Step S205)

The external device 30 receiving the detailed data from the wireless communication terminal 20 transmits a response message indicating that the detailed data has been received, to the wireless communication terminal 20. The second wireless interface 27 of the wireless communication terminal 20 receives the response message transmitted from the external device 30, via the second antenna 28. When the second wireless interface 27 receives the response message, the control unit 23 performs the sound output stop process to cause the sound output unit 26 to stop the sound output. Accordingly, the wireless communication terminal 20 displays only the message, thus reducing power consumption. Then, the process ends.

As described above, according to the first preferred embodiment, the wireless communication terminal 20 includes the display unit 25 and the sound output unit 26, and displays or outputs a message or a sound corresponding to the urgency based on the urgency data. Thus, since the message corresponding to the urgency is displayed on the display unit 25 of the wireless communication terminal 20, and the sound corresponding to the urgency is output from the sound output unit 26, it is possible to immediately confirm the urgency when the external device 30, which is a transmission destination of the detailed data, is in a remote place.

For example, in a case in which a patient implanted with the implantable medical device 10 can walk with the wireless communication terminal 20 such as a wristwatch capable of wireless communication with the implantable medical device 10, when an event such as treatment or device abnormality is generated in the implantable medical device 10, the wireless communication terminal 20 can cause a message (e.g., a state of a patient, a condition of the patient, or an urgency contact (of a hospital or a home)) according to the urgency data transmitted from the implantable medical device 10 to be displayed on the display unit 25. Thereby, a patient, a nearby person or a rushed ambulance worker can immediately confirm the urgency.

Second Preferred Embodiment

Next, a second preferred embodiment of the present invention will be described. The second preferred embodiment differs from the first preferred embodiment in that a biometric data monitoring system in the second preferred embodiment includes a plurality of external devices and a wireless communication terminal changes an external device, which is a transmission destination of detailed data, and transmission data based on urgency data transmitted from an implantable medical device.

Figure 8:
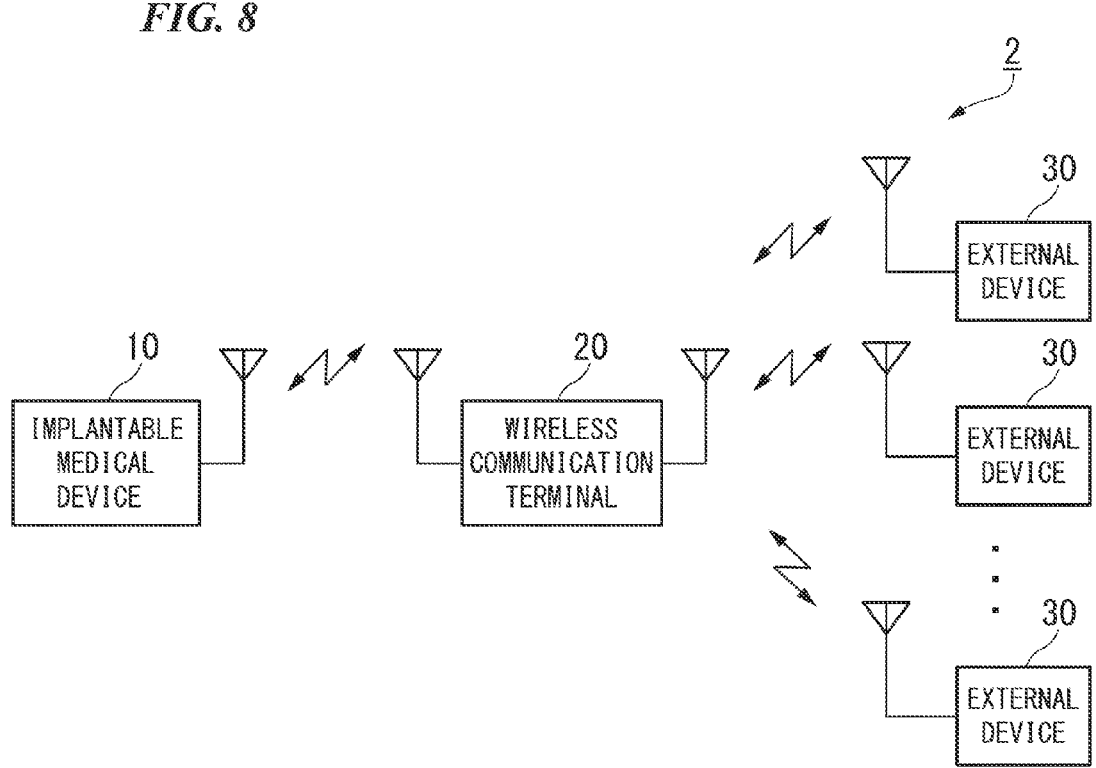
FIG. 8 is a schematic diagram illustrating a configuration of the biometric data monitoring system in accordance with a second preferred embodiment of the present invention.

FIG. 8 is a schematic diagram illustrating a configuration of the biometric data monitoring system in accordance with the second preferred embodiment of the present invention. The biometric data monitoring system 2 includes an implantable medical device 10, a wireless communication terminal 20, and a plurality of external devices 30. Further, configurations of the implantable medical device 10, the wireless communication terminal 20 and the external device 30 in the second preferred embodiment are the same as those of the respective units in the first preferred embodiment. Further, operations of the implantable medical device 10 and the external device 30 are the same as those of the respective units in the first preferred embodiment.

However, the implantable medical device 10 in the second preferred embodiment generates three types of urgency data based on acquired detailed data. Specifically, if an urgency judgment unit 13 of the implantable medical device 10 judges that detailed data output by a sensor unit 11 or a treatment unit 12 is detailed data needing to be transmitted rapidly (e.g., within 5 seconds) to the external device 30 of a family or a friend registered in the wireless communication terminal 20 in advance, the urgency judgment unit 13 generates urgency data indicating urgency "1." Further, if the urgency judgment unit 13 of the implantable medical device 10 judges that the detailed data output by the sensor unit 11 or the treatment unit 12 is detailed data needing to be transmitted rapidly (e.g., within 5 seconds) to the external device 30 registered in the wireless communication terminal 20 in advance, the urgency judgment unit 13 generates urgency data indicating urgency "2." Further, if the urgency judgment unit 13 of the implantable medical device 10 judges that the detailed data output by the sensor unit 11 or the treatment unit 12 is detailed data needing to be transmitted within a certain time (e.g., within one hour) to the external device 30 that is an Internet server for urgency registered in the wireless communication terminal 20 in advance, the urgency judgment unit 13 generates urgency data indicating urgency "3."

Figure 9:
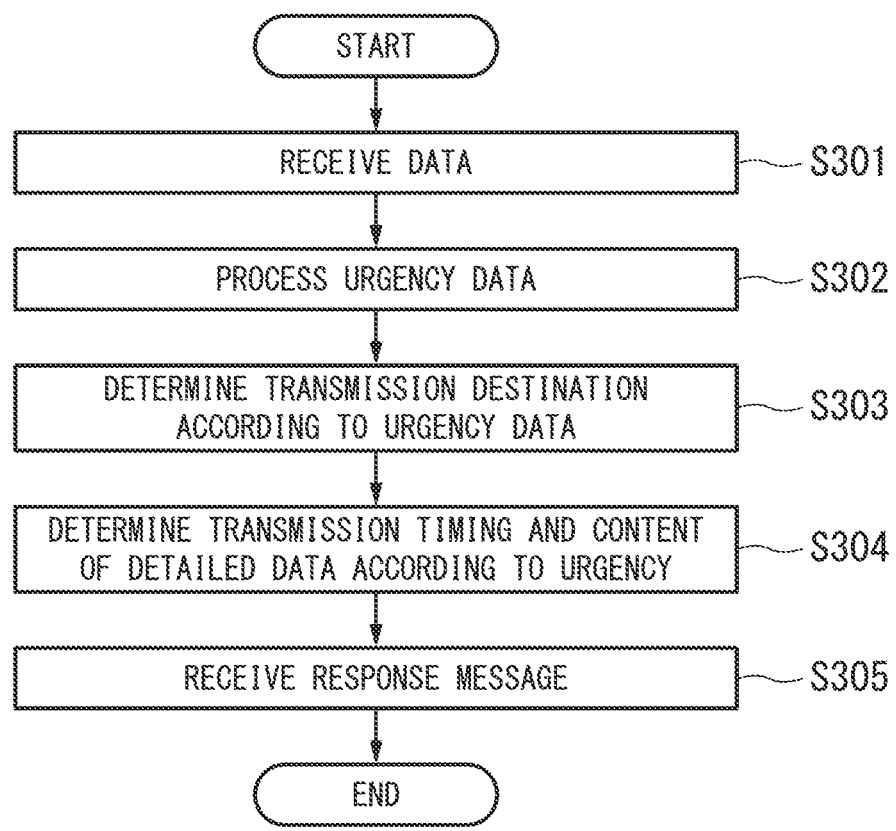
FIG. 9 is a flowchart illustrating the operation of the wireless communication terminal in accordance with the second preferred embodiment of the present invention.

Next, an operation of the wireless communication terminal 20 will be described with reference to FIG. 9. FIG. 9 is a flowchart illustrating the operation of the wireless communication terminal 20 in accordance with the second preferred embodiment of the present invention.
(Step S301)

A first wireless interface 22 of the wireless communication terminal 20 receives the urgency data and the detailed data transmitted from the implantable medical device 10 using a communication method agreed upon with the implantable medical device 10 in advance. In the second preferred embodiment, the communication method is agreed upon so that the urgency data is first received using a first wireless communication protocol and then the detailed data is received using a second wireless communication protocol. Specifically, the first wireless interface 22 receives the urgency data, which is transmitted from the implantable medical device 10, via a first antenna 21 using the first wireless communication protocol. Then, the first wireless interface 22 receives the detailed data, which is transmitted from the implantable medical device 10, via the first antenna 21 using the second wireless communication protocol. Then, the process proceeds to step S302.
(Step S302)

A control unit 23 decodes the urgency data received by the first wireless interface 22 in the process of step S301. Then, based on the urgency data, the control unit 23 controls a display unit 25 to display a message and controls a sound output unit 26 to output an alarm sound, voice, music or the like. For example, when the urgency data is data indicating urgency "1," the control unit 23 causes the display unit 25 to sequentially or iteratively display a message for help (alarm message) or a message such as a state of a patient, a condition of the patient, urgency contact (contact of a hospital or contact of family) and the sound output unit 26 to output a voice signal, alarm sound or the like for help. Further, when the urgency data is data indicating urgency "2," the control unit 23 causes the display unit 25 to sequentially or iteratively display a message such as a condition of a patient or a treatment history (content and number of treatments) and causes the sound output unit 26 to output a voice signal, alarm sound or the like for help. Further, when the urgency data is data indicating urgency "3," the control unit 23 causes the display unit 25 to sequentially or iteratively display a message indicating there being a treatment, battery power insufficiency, lead abnormality or main body abnormality and the sound output unit 26 to output, for example, a voice signal indicating device abnormality. The display unit 25 continues to display the message until a display stop process is performed. The sound output unit 26 continues to output the sound until a sound output stop process is performed. Then, the process proceeds to step S303. Further, the content of the message displayed on the display unit 25 or data such as the alarm sound, the voice or music is stored in a storage unit 24 of the wireless communication terminal 20 from another device using wireless communication in advance.
(Step S303)

The control unit 23 determines a transmission destination of the detailed data based on the urgency data. Then, the process proceeds to step S304. For example, a transmission destination according to the urgency data is set in the wireless communication terminal 20 in advance, and the storage unit 24 stores this set content. In the second preferred embodiment, when the urgency data is data indicating urgency "1," the control unit 23 determines the transmission destination of the detailed data to be the external device 30, such as a portable phone of a family or a friend or a television having a communication function, which has been registered in the wireless communication terminal 20 in advance. Further, when the urgency data is data indicating urgency "2," the control unit 23 determines the transmission destination of the detailed data to be the external device 30, such as a portable phone, a smart phone or an Internet server for urgency, which has been registered in the wireless communication terminal 20 in advance. Further, when the urgency data is data indicating urgency "3," the control unit 23 determines the transmission destination of the detailed data to be the external device 30 that is an Internet server for urgency registered to the wireless communication terminal 20 in advance.
(Step S304)

The control unit 23 determines a transmission timing of the detailed data and content of the detailed data based on the urgency data. Then, the process proceeds to step S305. For example, the transmission timing and the transmission content according to the urgency data are set in the wireless communication terminal 20 in advance, and the storage unit 24 stores this set content. In the second preferred embodiment, when the urgency data is data indicating urgency "1," the urgency data is data in which the transmission timing is rapid (e.g., within 5 seconds) and the transmission content indicates "help needed (alarm message), a state of a patient, a condition of the patient, or an urgency contact (a contact of a hospital or a contact of family)." When the urgency data is data indicating urgency "2," the urgency data is data in which the transmission timing is rapid (e.g., within 5 seconds) and the transmission content indicates "a condition of the patient or a treatment history (treatment content or the number of treatment times)." When the urgency data is data indicating urgency "3," the urgency data is data in which the transmission timing is within a certain time (e.g., within one hour) and the transmission content indicates "a treatment, battery power insufficiency, lead abnormality, or main body abnormality."
(Step S305)

The control unit 23 controls a second wireless interface 27 based on the transmission timing determined in the process of step S304 to start a wireless connection with the external device 30 determined to be the transmission destination of the detailed data in the process of step S303. Then, the process proceeds to step S306. For example, when the transmission timing is rapid (e.g., within 5 seconds), the control unit 23 controls the second wireless interface 27 to start the wireless connection within 5 seconds. Further, when the transmission timing is within a certain time (e.g., within one hour), the control unit 23 controls the second wireless interface 27 to start the wireless connection within one hour.
(Step S306)

The control unit 23 outputs the detailed data of the transmission content determined in the process of step S301 to the second wireless interface 27. The second wireless interface 27 acquires the detailed data output by the control unit 23 and transmits the detailed data to the external device 30 to which the wireless connection has started in the process of step S305. Then, the process proceeds to step S307.
(Step S307)

The external device 30 receiving the detailed data from the wireless communication terminal 20 transmits a response message indicating that the detailed data has been received, to the wireless communication terminal 20. The second wireless interface 27 of the wireless communication terminal 20 receives the response message transmitted from the external device 30. When the second wireless interface 27 receives the response message, the control unit 23 performs the sound output stop process to cause the sound output unit 26 to stop output of the sound. Accordingly, the wireless communication terminal 20 displays only the message, thus reducing power consumption. Then, the process ends.

As described above, according to the second preferred embodiment, the wireless communication terminal 20 includes the display unit 25 and the sound output unit 26, and displays or outputs the message or the sound corresponding to the urgency based on the urgency data. Accordingly, since the message corresponding to the urgency is displayed on the display unit 25 of the wireless communication terminal 20 and the sound corresponding to the urgency is output from the sound output unit 26, it is possible to immediately confirm the urgency even when the external device 30 that is a transmission destination of the detailed data is in a remote place. It is also possible to change the external device 30 that is the transmission destination of the detailed data according to the urgency. It is also possible to change the transmission timing of the detailed data according to the urgency. It is also possible to change the content of the detailed data according to the urgency.

While preferred embodiments of the present invention have been described and illustrated above, it should be understood that these are examples of the present invention and are not to be considered as limiting. Additions, omissions, substitutions, and other modifications can be made without departing from the scope of the present invention.

For example, in the first preferred embodiment, the wireless communication terminal 20 and the external device 30 perform the wireless communication in a one-to-one relationship. In the second preferred embodiment, the wireless communication terminal 20 and the external device 30 perform the wireless communication in a one-to-many relationship, but the present invention is not limited thereto. For example, the wireless communication terminal 20 and the external device 30 may perform the wireless communication in a many-to-many relationship.

Accordingly, the invention is not to be considered as being limited by the foregoing description, and is only limited by the scope of the claims.

What is claimed is:

1. A wireless communication terminal comprising:
a first interface that receives urgency data and detailed data, the urgency data indicating urgency of an event detected by an implantable medical device, the urgency data being transmitted from the implantable medical device using a first wireless communication protocol, the detailed data indicating details of the event and having a greater data size than the urgency data, the detailed data being transmitted from the implantable medical device using a second wireless communication protocol;
a second interface that transmits the detailed data to an external device using the second wireless communication protocol;
a display unit that displays information, or an audio output unit that outputs a sound; and
a control unit that performs control to cause the display unit to display summary information based on the urgency of the event or to cause the audio output unit to output a sound corresponding to the urgency data, the control unit performing control to cause the second interface to transmit the detailed data, which has been received by the first interface, to the external device based on the urgency data that has been received by the first interface, the control unit judging the urgency based on the urgency data and changing the external device, which is a transmission destination, to the other transmission destination based on the urgency.

2. The wireless communication terminal according to claim 1, wherein the first interface separately receives the urgency data and the detailed data.

3. The wireless communication terminal according to claim 1, wherein:
the first interface receives the urgency data, which has been encrypted using a first encrypting method, and
the second interface transmits the detailed data, which has been encrypted using a second encrypting method that is different from the first encrypting method, to the external device.

4. The wireless communication terminal according to claim 1, wherein the control unit determines a transmission timing of the detailed data based on the urgency.

5. The wireless communication terminal according to claim 1, wherein the control unit determines transmission content according to the detailed data based on the urgency.

6. The wireless communication terminal according to claim 1, wherein the control unit performs control to cause the display unit to display the summary information or to cause the audio output unit to output the sound and performs control to cause the second interface to transmit the detailed data, in a case where the urgency data which has been received by the first interface indicates high urgency.

* * * * *